US011321475B2

(12) United States Patent
Pope et al.

(10) Patent No.: US 11,321,475 B2
(45) Date of Patent: May 3, 2022

(54) ENTROPY DATA BASED ON ERROR CORRECTION DATA

(71) Applicant: HEWLETT PACKARD ENTERPRISE DEVELOPMENT LP, Houston, TX (US)

(72) Inventors: Eric L. Pope, Tomball, TX (US); Richard Cheung, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 591 days.

(21) Appl. No.: 16/152,135

(22) Filed: Oct. 4, 2018

(65) Prior Publication Data

US 2020/0110891 A1 Apr. 9, 2020

(51) Int. Cl.
*G06F 21/62* (2013.01)
*G06F 7/58* (2006.01)

(52) U.S. Cl.
CPC ........... *G06F 21/62* (2013.01); *G06F 7/58* (2013.01); *G06F 7/582* (2013.01); *G06F 7/588* (2013.01)

(58) Field of Classification Search
CPC combination set(s) only.
See application file for complete search history.

(56) References Cited

U.S. PATENT DOCUMENTS

| 7,801,121 B1* | 9/2010 | Van Wageningen ... H04Q 11/04 370/386 |
| 10,372,528 B1* | 8/2019 | Anderson ........... G06F 11/1012 |
| 2014/0037086 A1 | 2/2014 | Seol et al. |
| 2014/0136583 A1 | 5/2014 | Hyde et al. |
| 2015/0355886 A1 | 12/2015 | Peeters et al. |

FOREIGN PATENT DOCUMENTS

CN 104615407 B 10/2017

OTHER PUBLICATIONS

Tetsufumi Tanamoto et al., "High-Speed Magnetoresistive Random-Access Memory Random Number Generator Using Error-correcting Code," Jun. 10, 2016, pp. 1-5.
Whitewood Encryption Systems, Inc., Understanding and Managing Entropy, 2015 (7 pages).

* cited by examiner

*Primary Examiner* — Paul E Callahan
(74) *Attorney, Agent, or Firm* — Trop, Pruner & Hu, P.C.

(57) ABSTRACT

In some examples, a system obtains error correction data for data stored in a memory, produces entropy data using the error correction data, adds the produced entropy data to a pool of entropy data, and performs a security operation using selected entropy data from the pool of entropy data.

16 Claims, 4 Drawing Sheets

ENTROPY DATA BASED ON ERROR CORRECTION DATA

BACKGROUND

A computing system can perform various operations. Data associated with such operations can include sensitive or confidential data that may be subjected to unauthorized access or manipulation by attackers. To protect such data, a security mechanism can be implemented.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Examples of security operations that can be performed in computing systems to protect data or an entity (e.g., a user, a program, or a machine) include cryptographic operations that encrypt original data to produce encrypted data that prevents unauthorized entities from easily recovering the original data. Examples of unauthorized entities include unauthorized users, unauthorized programs, or unauthorized machines. In other examples, security operations can generate passwords for use in gaining access to a network, a system, a device, a program, and so forth. More generally, a "security operation" refers to any operation that takes action to protect data or an entity from unauthorized access or manipulation.

In some cases, security operations can be based on use of random numbers generated by pseudo-random number generators, whether implemented in hardware or as machine-readable instructions (e.g., software and/or firmware).

In some examples, random data can be used to create a key, such as for encrypting data. More specifically, the random data can be used to produce a key pair, including a public key and a private key. In some examples, the random number can be used as the key. In other examples, a function can be applied on the random number to produce the key. The private key can be used to encrypt data by a sender device, and the public key can be used to decrypt encrypted data received by a receiver device. To generate a password, the random number can be used as the password, or alternatively, the random number can be concatenated with a string of characters to use as a password.

A pseudo-random number generator (or more briefly, a "random number generator") produces a random number based on a seed provided to the random number generator. A "seed" is a value that is used to initialize the random number generator, which then proceeds to produce a collection of random numbers.

An example of a pseudo-random number generator is a linear feedback shift register circuit. The width of the shift register is based on the size of the random number that is to be produced. For example, a 32-bit shift register can be used to generate a 32-bit random number sequence, with a shifting operation in successive cycles of the shift register producing the sequence of random numbers. The linear feedback shift register circuit is given a seed, which provides the initial value of the shift register. The shift register successively produces a sequence of random numbers starting from the initial value.

An issue associated with producing a random number based on a seed is that if the seed is obtained by an unauthorized entity, the unauthorized entity may be able to reproduce the collection of random numbers generated by a random number generator. Once the unauthorized entity is able to reproduce the collection of random numbers of a random number generator, then the unauthorized entity may defeat any security operation based on the random numbers of the random number generator.

To alleviate the issue of an unauthorized entity being able to reproduce random numbers generated by a random number generator, various techniques seek to increase entropy of random number generation. Entropy can refer to an uncertainty of an outcome (e.g., generation of a random number) that has not yet occurred. Increasing the entropy of random number generation reduces the likelihood that an unauthorized entity is able to reproduce random numbers generated by a random number generator.

Examples techniques that seek to increase entropy of random number generation use events such as keyboard presses and mouse movements to derive entropy data that can be used as seed values for random number generation. "Entropy data" can refer generally to data that is generated often in an unpredictable manner. For example, mouse movements and keyboard presses by actual users may not easily be predicted. However, the entropy that may be available based on keyboard presses and mouse movements may not be sufficient, especially in scenarios where the same key (or sequence of keys) is pressed repetitively, or if a user does not use the keyboard or mouse for a long period of time.

In accordance with some implementations of the present disclosure, additional sources of entropy are added to other possible sources of entropy, where the additional sources of entropy can include error correction data generated for data stored in a memory.

Figure 1:
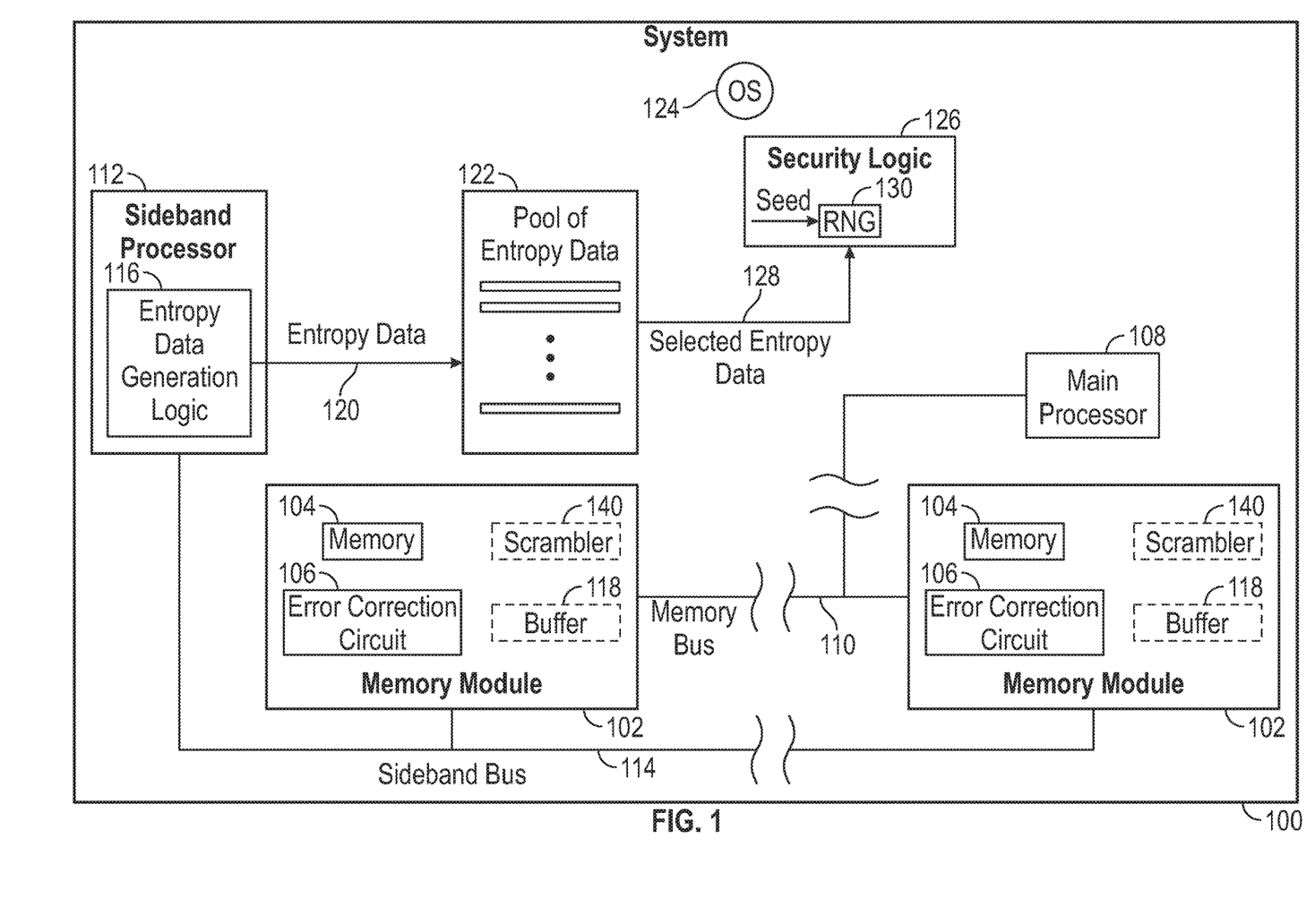
FIG. 1 is a block diagram of a system according to some examples.

As shown in FIG. 1, a system 100 may include multiple (two or more) memory modules 102. In other examples, the system 100 can include just one memory module 102. The system 100 can refer to a single computer or an arrangement of multiple computers. For example, the system 100 can include a server system accessible by client devices to access services, such as services provided by applications, storage services (to store data in persistent storage media or in databases), communication services, and so forth. In other examples, the system 100 can be part of a cloud that is accessible by tenants (users or devices) of the cloud to access cloud services. In further examples, the system 100 can include a user device, such as a desktop computer, a notebook computer, a tablet computer, a smartphone, a game appliance, an Internet-of-Things (IoT) device, and so forth.

A memory module 102 can refer to any arrangement of circuitry that includes a memory 104 and associated circuitry. The memory module 102 can be in the form of an integrated circuit memory device, a circuit board or other support structure on which the memory 104 and associated circuitry can be mounted (e.g., a dual in-line memory module or DIMM, etc.), and so forth. In the latter example where the memory module 102 is implemented as a circuit board or other support structure, the memory module 102 has input/output (I/O) pins or other electrical contact structures to connect to a connector in a system.

A memory 104 can be implemented as a single memory device or as multiple memory devices. The memory module 104 further includes an error correction circuit 106 associated with the memory 104. The error correction circuit 106 generates error correction data based on data stored in the memory 104. For example, during a write operation in which write data is written to the memory 104, the error correction circuit can generate the error correction data corresponding to the write data, and can store the write data with the error correction data in the memory 104. During a read operation, data and the associated error correction data is read from the memory 104, and the error correction data is used to determine whether an error is present in the read data, and if so, the error correction data may be used to correct the error.

Error correction data can include an error correction code generated using any of various error correction algorithms, such as a Hamming code algorithm, a Bose-Chadhuri-Hocquenghem code algorithm, and so forth. An error correction code is generated based on data written to or retrieved from a memory. Different error correction codes can be used to detect and correct different numbers of bits in the data (e.g., a one-bit error, a two-bit error, and so forth).

The error correction circuit 106 can be implemented using a programmable gate array, a programmable integrated device, or any other type of hardware processing circuit. Although FIG. 1 shows the error correction circuit 106 being outside the memory 104, it is noted that in other examples, the error correction circuit 106 may be part of the memory 104. In addition, in alternative examples, instead of including the error correction circuit 106 in each memory module 102, the error correction circuit 106 may be external of the memory modules 102. For example, the error correction circuit 106 can be included as part of a memory controller that controls access (read access and write access) of the memory modules 102.

The data stored in the memories 104 of the memory modules 102 can include data of a workload that is executed in the system 100. A workload can refer to a task or a collection of tasks that is performed in the system 100 due to execution of an application, an operating system, or other machine-readable instructions on a main processor 108 or another hardware processing circuit, and/or due to operation of hardware components (e.g., input/output (I/O) components, etc.), and/or due to user actions. The heavier the workload in the system 100, the more data that is generated for storing in the memories 104. Generating more data leads to an increased amount of generated error correction data, which leads to an increased amount of entropy data that can increase the entropy of security operations.

The main processor 108 is coupled over a memory bus 110 to the memory modules 102. Although not shown in FIG. 1, the main processor 108 can be connected to a memory controller, which in turn is connected to the memory bus 110. In other examples, the main processor 108 can include a memory controller so that the main processor 108 can also be connected on the memory bus 110.

In addition to the main processor 108, the system 100 also includes a sideband processor 112 that is connected over a sideband bus 114 to the memory modules 102. A "sideband" bus can refer to a bus that is separate from another data path to the memory modules 102, such as the memory bus 110 that is to transfer data between the main processor 108 (and other components) and the memory modules 102. The "sideband" processor 112 is separate from the main processor 108. The sideband processor 112 can be designated to perform various management tasks of the system 100, so that the main processor 108 does not have to perform such management tasks.

A "processor" (e.g., 108 or 112) can include a microprocessor, a core of a multi-core microprocessor, a microcontroller, a programmable integrated circuit, a programmable gate array, a digital signal processor, or another hardware processing circuit.

One of the management tasks that can be performed by the sideband processor 112 is generation of entropy data based on error correction data produced by the memory modules 102. As depicted in FIG. 1, the sideband processor 112 includes entropy data generation logic 116. The entropy data generation logic 116 can be implemented as a hardware processing circuit of the sideband processor 112, or alternatively, can be implemented as machine-readable instructions executable on the sideband processor 112.

In other examples, the entropy data generation logic 116 can be included as part of the main processor 108 or another electronic component.

As further shown in FIG. 1, each memory module 102 can include a buffer 118 to temporarily store data of the memory 104 and associated error correction data generated by the error correction circuit 106. In other examples, the buffer 118 can be omitted from each memory module 102.

The entropy data generation logic 116 can obtain error correction data, which can be from a selected one of the memory modules 102 or multiple ones of the memory modules 102. The error correction data can be obtained over the sideband bus 114 from either the buffer(s) 118 or the memory (or memories) 104 of the selected memory module(s) 102.

The error correction data obtained from a memory 104 can be error correction data associated with write data written to the memory 104, or read data retrieved from the memory 104.

The entropy data generation logic 116 produces entropy data using the obtained error correction data. In some examples, a portion of the obtained error correction data (e.g., an error correction code) can be used as the entropy data. The "portion" of the obtained error correction data can refer to the entire obtained error correction data, or just a part (less than an entirety) of the obtained error correction data. In other examples, a portion of the obtained error correction data can be converted to a different form for use as the entropy data; for example, the portion of the obtained error correction data can be subjected to encoding, scrambling, encrypting, or any other function, to produce the entropy data.

The entropy data generation logic 116 adds the produced entropy data (120) to a pool of entropy data 122. The pool of entropy data 122 can include entropy data from various sources of entropy data. A pool of entropy data can refer to a data structure (e.g., a list, a table, etc.) that contains entropy data received from a number of sources. When a request is received for entropy data, an entropy data is retrieved from the pool of entropy data 122.

The entropy data generation logic 116 of the sideband processor 112 is one source of entropy data. Other sources of entropy data can include entropy data produced using keyboard presses, mouse movements, sensors (e.g., temperature sensors that measure temperatures), and so forth. Although not shown, an aggregator can aggregate entropy data from multiple sources, including the entropy data generation logic 116. The aggregator can merge the entropy data from the pool of entropy data 122 and entropy data from other source(s) into a larger pool of entropy data.

The pool of entropy data 122 can be contained in a data structure that is stored in a memory or persistent storage. In some examples, the pool of entropy data 122 (or the larger pool of entropy data that contains entropy data from multiple sources) can be maintained by an operating system (OS) 124 of the system 100. The OS 124 includes machine-readable instructions that control hardware devices and the operating environment of the system 100.

In other examples, the pool of entropy data 122 (or the larger pool of entropy data that contains entropy data from multiple sources) can be maintained by a different entity in the system 100.

In the present disclosure, a "pool of entropy data" can refer to the pool of entropy data that includes entropy data from just the entropy data generation logic 116 of the sideband processor 112, or alternatively, can refer to a larger pool containing entropy data from multiple sources.

The system 100 further includes a security logic 126 that can perform a security operation using a selected entropy data (128) that is selected from the pool of entropy data 122. The security logic 126 can be implemented as a hardware processing circuit or as machine-readable instructions. In some examples, the security logic 126 can be part of the operating system 124. In other examples, the security logic 126 can be separate from the operating system 124.

Examples of security operations that can be performed by the security logic 126 include any or some combination of the following: a cryptographic operation (e.g., that encrypts data), password generation (e.g., generating a password used to access data or an entity), and so forth.

The security logic 126 can include a random number generator 130 that generates a random number used as part of the security operation. For example, random numbers can be generated for performing encryption, password generation, and so forth. The random number generator 130 is initialized using a seed, and once initialized, the random number generator 130 is able to produce random numbers. In some examples, the seed of the random number generator 130 includes the entire selected entropy data 128 or a part of the selected entropy data 128. In other examples, the selected entropy data 128 can be converted to a different form (e.g., by scrambling, encoding, encrypting, etc.) to produce a different value that is used as the seed of the random number generator 130. For example, the entropy data can be directly used as the initial value of the random number sequence to be produced by the random number generator 130. Alternatively, the entropy data is converted into a different value that is used as the initial value of the random number sequence to be produced by the random number generator 130.

In some examples, to enhance entropy in security operations performed by the security logic 126, multiple layers of indirection can be employed in the generation of entropy data based on error correction data. One layer of indirection is based on selective use of the memory modules 102 to obtain error correction data for producing entropy data. For example, the entropy data generation logic 116 can select a subset (one or multiple) of the memory modules 102 from which error correction data is to be obtained. In further examples, the entropy data generation logic 116 can select the memory modules 102 in a given sequence or sequences. In other examples, the entropy data generation logic 116 can randomly select a subset of the memory modules 102 from which error correction data is to be obtained to produce entropy data.

Changing the memory modules 102 from which the error correction data is obtained to produce entropy data makes it more difficult for an attacker to derive the selected entropy data 128 that is used by the security logic 126 for a security operation.

In further examples, another layer of indirection can be provided by using scramblers 140 in the memory modules 102. A scrambler 140 in a memory module 102 scrambles data before error correction data is generated by the error correction circuit 106. Data read from the memory 102 is scrambled by the scrambler 140, and the error correction circuit 106 generates error correction data (e.g., an error correction code) based on the scrambled data. Scrambling can include changing the order of bits of the data, applying some type of encoding on the data, applying encryption on the data, applying another function on the data, and so forth. By scrambling the data prior to generating the error correction data by the error correction circuit 106, an attacker would find it more difficult to derive the selected entropy data 128 used by the security logic 126 in performing a security operation.

In other examples, instead of including a scrambler 140 in a memory module 102, the scrambler 140 may instead be included as part of the main processor 108 or another electronic component.

In some examples, the obtaining of the error correction data from selected memory module(s) 102 can be performed at fixed or variable time intervals. Using variable time intervals to sample error correction data form the selected memory module(s) 102 can provide a further layer of indirection, since the unauthorized entity would be unable to guess when error correction data was obtained from the selected memory module(s) 102 to produce entropy data.

In addition, in examples where the entropy data generation logic 116 is implemented in the sideband processor 112, the entropy data generation logic 116 is unable to determine a memory address of an error correction data obtained from a selected memory module 102, which is another layer of indirection. This is because memory addressing is available to the main processor 108, but not to the sideband processor 112, which does not use memory addresses to access the memories 104 of the memory modules 102.

A further layer of indirection is associated with the fact that the error correction data used to produce entropy data can be selectively based on write data or read data. In some instances, the entropy data generation logic 116 can selectively use error correction data for write data for producing entropy data, while in other instances, the entropy data generation logic 116 can selectively use error correction data for read data for producing entropy data.

The use of multiple layers of indirection such as those discussed above for generating entropy data based on error correction data can improve the quality of the entropy data produced, by enhancing the entropy of security operations that use the entropy data.

Figure 2:
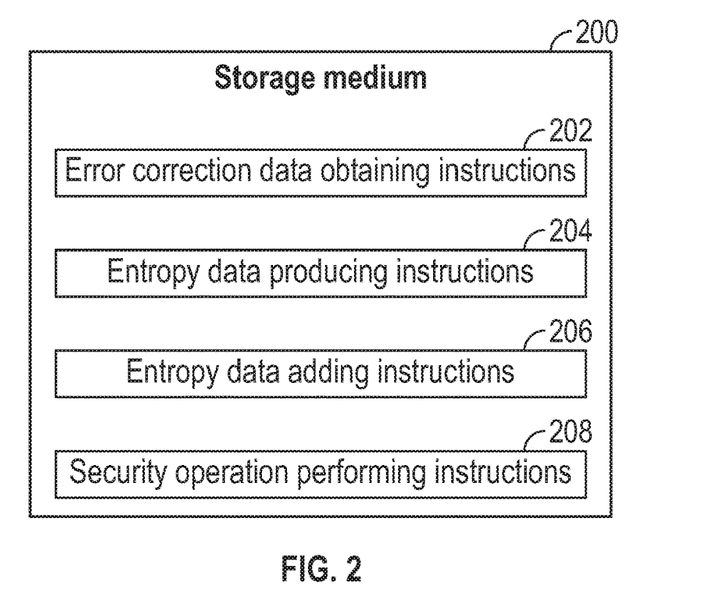
FIG. 2 is a block diagram of a storage medium storing machine-readable instructions according to some examples.

FIG. 2 is a block diagram of a non-transitory machine-readable or computer-readable storage medium 200 comprising machine-readable instructions that upon execution cause a system to perform various tasks. The machine-readable instructions include error correction data obtaining instructions 202 to obtain error correction data for data stored in a memory. Obtaining the error correction data can include selecting from among the memory modules 102 for retrieving error correction data, and/or retrieving error correction data based on a scrambled version of memory data written to or read from a memory 104, and/or retrieving error correction data based on sampling error correction data at fixed or variable time intervals from a selected memory module 102, and/or retrieving error correction data based on selective use of error correction data for write data or read data.

The machine-readable instructions further include entropy data producing instructions 204 to produce entropy data using the error correction data. In some examples, a portion of the error correction data can be used as the entropy data. The "portion" of the obtained error correction data can refer to the entire obtained error correction data, or just a part (less than an entirety) of the obtained error correction data. In other examples, a portion of the obtained error correction data can be converted to a different form for use as the entropy data; for example, the portion of the obtained error correction data can be subjected to encoding, scrambling, encrypting, or any other function, to produce the entropy data.

The machine-readable instructions additionally include entropy data adding instructions 206 to add the produced entropy data to a pool of entropy data. The produced entropy data can be added to a pool of entropy data maintained by an operating system or another entity. The produced entropy data can be aggregated into the pool of entropy data with entropy data from other sources.

The machine-readable instructions also include security operation performing instructions 208 to perform a security operation using selected entropy data from the pool of entropy data. The security operation can include cryptographic operations that encrypt original data to produce encrypted data that prevents unauthorized entities from easily recovering the original data. Alternatively, a security operation can generate passwords for use in gaining access to a network, a system, a device, a program, and so forth. More generally, a security operation can refer to any operation that takes action to protect data or an entity from unauthorized access or manipulation.

Figure 3:
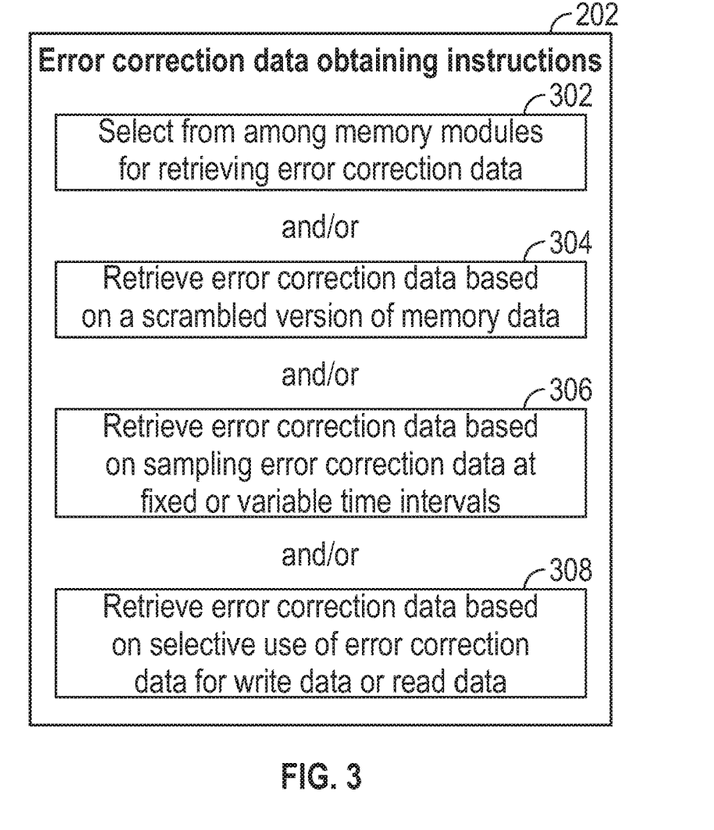
FIG. 3 is a block diagram of tasks of machine-readable instructions to obtain error correction data, according to some examples.

As shown in FIG. 3, the error correction data obtaining instructions 202 can select (302) from among the memory modules 102 for retrieving error correction data, and/or can retrieve (304) error correction data based on a scrambled version of memory data written to or read from a memory 104, and/or can retrieve (306) error correction data based on sampling error correction data at fixed or variable time intervals from a selected memory module 102, and/or can retrieve (308) error correction data based on selective use of error correction data for write data or read data.

Selecting (302) from among the memory modules 102 can refer to selecting just one memory module, or selecting multiple memory modules. In some examples, the selecting (302) can select the memory modules 102 in a given sequence or sequences. In other examples, the selecting (302) can randomly select a subset of the memory modules 102.

Retrieving (304) error correction data based on a scrambled version of memory data written to or read from a memory 104 can refer to retrieving error correction data generated by first scrambling the memory data, and then producing the error correction data based on the scrambled data. The scrambling can be performed by a scrambler in a memory module or in a main processor.

Retrieving (306) error correction data based on sampling error correction data at a fixed time interval refers to periodically selecting (at a fixed period) a memory module 102 from which error correction data is retrieved. Retrieving (306) error correction data based on sampling error correction data at a variable time interval refers to selecting (at different time intervals) memory modules 102 from which error correction data is retrieved.

Retrieving (308) error correction data based on selective use of error correction data for write data or read data can refer to retrieving error correction data based on write data in some cases, and retrieving error correction data based on read data in other cases. Selectively using error correction data based on write data and read data at different times adds another layer of indirection.

Figure 4:
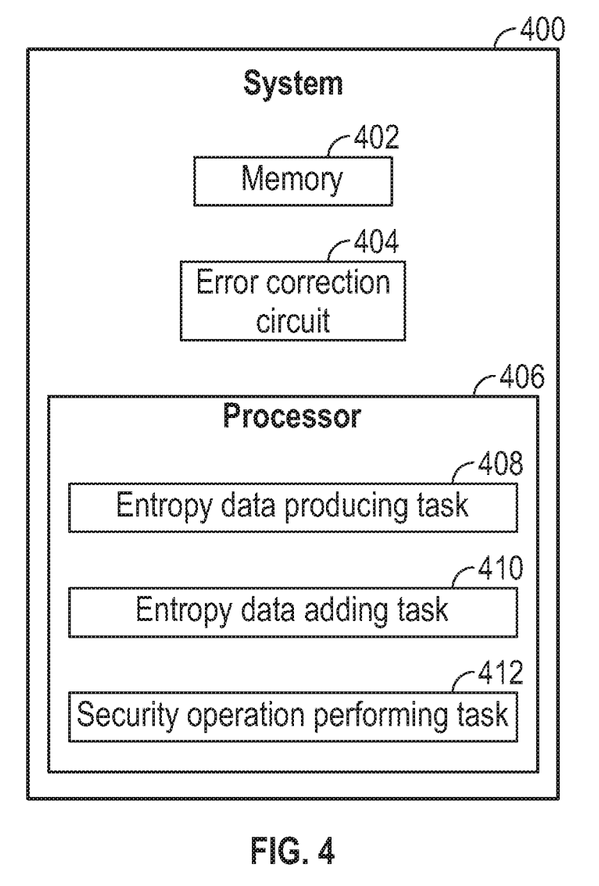
FIG. 4 is a block diagram of a system according to further examples.

FIG. 4 is a block diagram of a system 400 including a memory 402 to store data, and an error correction circuit 404 to generate error correction data for the data. The system 400 further includes a processor 406 to perform various tasks. A processor performing a task can refer to a single processor performing the task or multiple processors performing the task.

The tasks of the processor 406 include an entropy data producing task 408 to produce entropy data using the error correction data. The tasks further include an entropy data adding task 410 to add the produced entropy data to a pool of entropy data, and a security operation performing task 412 to perform a security operation using selected entropy data from the pool of entropy data.

Figure 5:
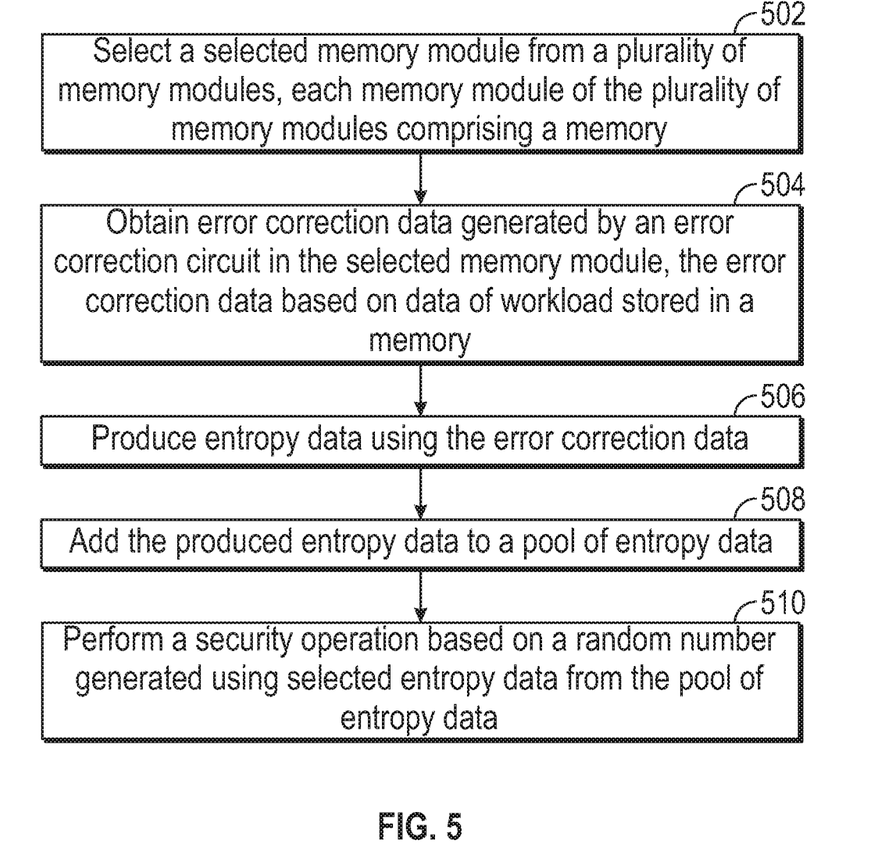
FIG. 5 is a flow diagram of a process according to some examples.

FIG. 5 is a flow diagram of a process that can be performed by a system according to some examples.

The process of FIG. 5 includes selecting (at 502) a selected memory module from a plurality of memory modules, each memory module of the plurality of memory modules comprising a memory. Selecting (502) from among the memory modules can refer to selecting just one memory module, or selecting multiple memory modules. In some examples, the selecting (502) can select the memory modules in a given sequence or sequences. In other examples, the selecting (502) can randomly select a subset of the memory modules.

The process further includes obtaining (at 504) error correction data generated by an error correction circuit in the selected memory module, the error correction data based on data of a workload stored in a memory. The workload can include a write operation to write data to the memory and/or a read operation to read data from the memory. The obtained error correction data may be based on a scrambled version of data written to or read from the memory. The error correction data may be obtained at fixed or variable time intervals.

The process also includes producing (at 506) entropy data using the error correction data. In some examples, a portion of the error correction data can be used as the entropy data. In other examples, a portion of the obtained error correction data can be converted to a different form for use as the entropy data; for example, the portion of the obtained error correction data can be subjected to encoding, scrambling, encrypting, or any other function, to produce the entropy data.

The process further includes adding (at 508) the produced entropy data to a pool of entropy data. The produced entropy data can be added to a pool of entropy data maintained by an operating system or another entity. The produced entropy data can be aggregated into the pool of entropy data with entropy data from other sources.

The process further includes performing (at 510) a security operation based on a random number generated using selected entropy data from the pool of entropy data. The security operation can include cryptographic operations that encrypt original data to produce encrypted data that prevents unauthorized entities from easily recovering the original data. Alternatively, a security operation can generate passwords for use in gaining access to a network, a system, a device, a program, and so forth. More generally, a security operation can refer to any operation that takes action to protect data or an entity from unauthorized access or manipulation.

The storage medium 200 of FIG. 2 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
    obtain error correction data for data stored in a memory;
    produce entropy data using the error correction data;
    add the produced entropy data to a pool of entropy data; and
    perform a security operation using selected entropy data from the pool of entropy data,
    wherein obtaining the error correction data, producing the entropy data, and adding the produced entropy data are performed by a sideband processor coupled over a sideband bus to the memory, and
    wherein the sideband processor is unable to determine a memory address of data on which the error correction data is generated.

2. The non-transitory machine-readable storage medium of claim 1, wherein performing the security operation using the selected entropy data comprises generating a random number based on the selected entropy data.

3. The non-transitory machine-readable storage medium of claim 2, wherein generating the random number based on the selected entropy data comprises using the selected entropy data as a seed for a random number generator that produces the random number.

4. The non-transitory machine-readable storage medium of claim 1, wherein the error correction data is generated by an error correction circuit associated with the memory.

5. The non-transitory machine-readable storage medium of claim 1, wherein the system comprises a plurality of memory modules comprising respective error correction circuits for generating error correction data for respective memory modules of the plurality of modules, and wherein the instructions to obtain the error correction code comprise instructions to:
    select a selected memory module from among the plurality of memory modules; and
    retrieve the error correction data from the selected memory module.

6. The non-transitory machine-readable storage medium of claim 1, wherein the error correction data is generated based on a scrambled version of data of the memory.

7. The non-transitory machine-readable storage medium of claim 1, wherein obtaining the error correction data is based on sampling the error correction data from the memory or multiple memories at variable time intervals.

8. The non-transitory machine-readable storage medium of claim 1, wherein obtaining the error correction data is based on selective use of error correction data for write data or read data.

9. A system comprising:
    a memory module that includes:
        a memory to store data;
        an error correction circuit to generate error correction data for the data;
    a host processor; and
    a sideband processor different from the main processor, wherein the sideband processor is connected to the memory module over a sideband bus, the sideband processor to:
        produce entropy data using the error correction data,
        add the produced entropy data to a pool of entropy data, and
        perform a security operation using selected entropy data from the pool of entropy data,
    wherein the sideband processor is unable to determine a memory address of data on which the error correction data is generated.

10. The system of claim 9, wherein the memory module is a first memory module, and the system further comprises a second memory module comprising a memory and an error correction circuit,
    wherein the sideband processor is to:
    select a selected memory module from a plurality of memory modules including the first memory module and the second memory module, and
    obtain error correction data from the selected memory module to produce entropy data to add to the pool of entropy data.

11. The system of claim 9, further comprising:
a security logic to access the pool of entropy data to retrieve the selected entropy data to use in the security operation.

12. The system of claim 11, wherein the security operation comprises generating a random number using the selected entropy data.

13. The system of claim 9, wherein the error correction circuit is to generate the error correction data based on a scrambled version of the data stored by the memory.

14. The system of claim 9, wherein the processor is to sample multiple error correction data generated by the error correction circuit based on data of a workload in the system.

15. A method of a system comprising a hardware processor, comprising:
selecting a selected memory module from a plurality of memory modules, each memory module of the plurality of memory modules comprising a memory;
obtaining error correction data generated by an error correction circuit in the selected memory module, the error correction data based on data of a workload stored in a memory;
producing entropy data using the error correction data;
adding the produced entropy data to a pool of entropy data; and
performing a security operation based on a random number generated using selected entropy data from the pool of entropy data,
wherein the hardware processor is a sideband processor coupled over a sideband bus to the selected memory module,
wherein obtaining the error correction data, producing the entropy data, and adding the produced entropy data are performed by the sideband processor, and
wherein the sideband processor is unable to determine a memory address of data on which the error correction data is generated.

16. The method of claim 15, wherein obtaining the error correction data is based on sampling error correction data at variable time intervals from the plurality of memory modules, and selectively using error correction data for write data and read data at different times.

\* \* \* \* \*